J. G. SMITH.
HAND VISE.
APPLICATION FILED JAN. 19, 1909.

919,971.

Patented Apr. 27, 1909.

Inventor
John G. Smith.
By C.A. Snow & Co.
Attorneys

Witnesses

UNITED STATES PATENT OFFICE.

JOHN G. SMITH, OF WAHOO, NEBRASKA.

HAND-VISE.

No. 919,971.   Specification of Letters Patent.   Patented April 27, 1909.

Application filed January 19, 1909. Serial No. 473,124.

*To all whom it may concern:*

Be it known that I, JOHN G. SMITH, a citizen of the United States, residing at Wahoo, in the county of Saunders and State of Nebraska, have invented a new and useful Hand-Vise, of which the following is a specification.

The present invention is a gripping tool in the nature of a hand vise, embodying certain novel features of construction, to be hereinafter described and claimed.

The object of the invention is to provide a novel jaw adjustment, and also to provide a jaw structure, and means for operating the jaws, which enables the tool to be used as a wrench and pliers.

The invention is illustrated in the accompanying drawings, in which:—

Figure 1:
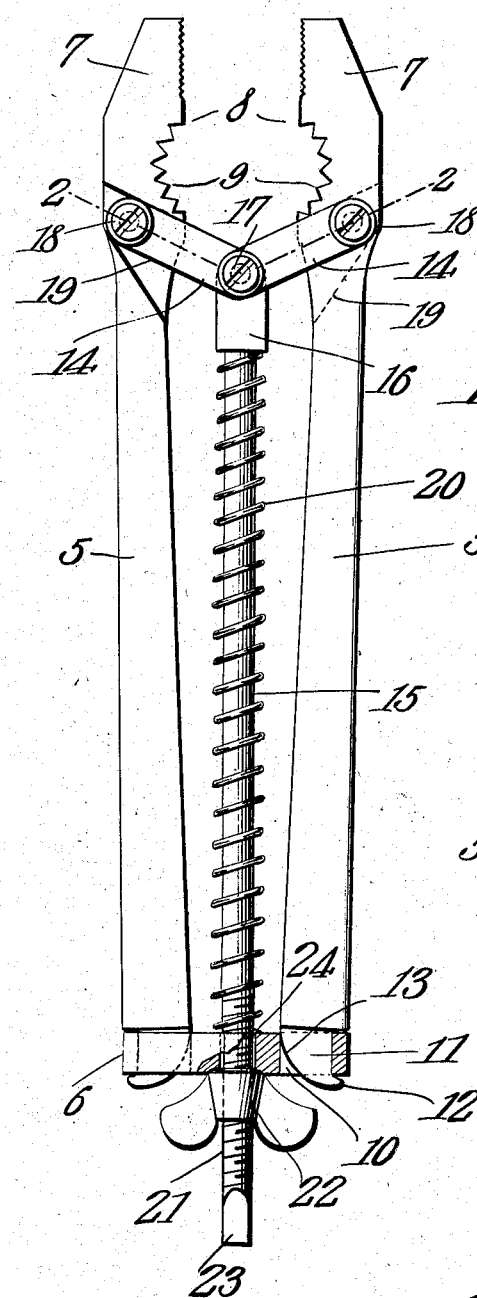
Figure 2:
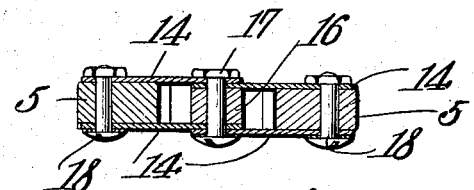

Figure 1 is an elevation of the tool, parts being shown broken away: Fig. 2 is a transverse section on the line 2—2 of Fig. 1.

Referring more particularly to the drawing, 5 denotes a pair of shanks, which are spaced apart and loosely connected at one end by a cross-bar 6. At the other end, the shanks are formed into gripping jaws 7, having plane faces 8, and concave faces 9, the latter faces being adapted to be used when the tool is employed to grip a pipe or other round object. The jaw faces are serrated, as usual. As already stated, the connection between the shanks is a loose one, the cross-bar 6 being formed with openings 10, in which reduced ends 11 of the shanks fit. Said reduced ends terminate in hooks 12, which project over the outer edge of the openings 10, and serve to prevent the shanks 5 from pulling out of said openings. The reduced ends 11 of the shanks are also rounded or curved, as indicated at 13, so that said ends may rock in the openings 10 when the shanks are swung toward or from each other, to close or open the jaws.

To the jaws 7 are pivoted links 14, which are also pivotally connected to a thrust rod 15, to form a toggle. The thrust rod 15 has at one end a head or enlargement 16, to which the links 14 are pivoted, as indicated at 17, by means of a transverse bolt or other suitable connection. The links 14 are pivoted to the jaws by transverse bolts 18 or other suitable connections. A pair of links 14 is connected to each of the jaws 7, as herein described, on both sides thereof, between which the head 16 is received. Each of the jaws 7 is recessed on one side, as indicated at 19, in which recess one of the links 14 works. These recesses serve as stops to limit the opening movement of the jaws, and also permit connection with the head 16 to be made without the use of washers, the depth of the recesses 19 being the same as the thickness of the links, so that one link may extend flush with the side of the head to which it is connected, and the other link extend flush with the outer surface of said link.

Between the head 16 and the cross-bar 6, a spring 20 is coiled around the rod 15. Said rod is also screw-threaded at its end opposite the head, as indicated at 21, and on said threaded end is mounted a wing nut 22. The threaded end of the rod terminates in a beveled portion 23, which may be used as a screw-driver. The threaded portion of the rod extends loosely through an opening 24 in the cross-bar 6, said opening being countersunk at its outer end, so that the threads cannot pull against the cross-bar. The wing nut 22 is screwed on the threaded portion 21 of the rod to engage behind the cross-bar, and is for the purpose of adjusting the jaws, as well as for locking them on the object to be held. The base of the wing nut seats in the countersink of the opening 24.

The jaws are closed by a grip on the shanks 5, and they are opened by the spring 20. When it is desired to lock the jaws on the object, the stem 15 is drawn downwardly by the wing nut 22 until the jaws firmly grip the work, and, as the wing nut is in engagement with the cross-bar 6, the work will be securely held. Upon turning the wing nut in the opposite direction, the spring 20 pushes the rod 15 upwardly, and, through the toggle, spreads the jaws, and the work is thus released.

The tool herein described is simple in construction, and effectually serves the purpose for which it is designed. By reason of the shape of the jaws, as well as the means for operating the same, the tool may be used as a wrench, pliers, tweezers, and a hand vise, and, by the shape of the jaw faces, flat and round objects may be held with equal facility.

What is claimed is:—

1. A hand vise comprising a pair of shanks formed at one end with jaws, a cross-bar loosely connecting the other ends of the shanks and formed with an opening intermediate thereof, toggle-links connected to the jaws, a thrust rod operatively connected to the toggle-links and extending through the opening in the cross-bar, said rod being screw-threaded, and a nut screwed on the rod and engageable behind the cross-bar.

2. A hand vise comprising a pair of shanks formed at one end with jaws, and having at the other end reduced, hook-shaped ends, a cross-bar connecting said reduced ends, said cross-bar having openings in which said ends loosely seat, toggle-links connected to the jaws, a thrust rod operatively connected to the toggle-links, and means for operating the thrust rod.

3. A hand vise comprising a pair of shanks formed at one end with jaws, a cross-bar loosely connecting the other ends of the shanks, toggle-links connected to the jaws, a thrust rod having an enlargement to which the toggle-links are connected, a spring coiled around the thrust rod between said enlargement and the cross-bar, and means for locking the thrust rod against movement in a direction to open the jaws.

4. A hand vise comprising a pair of shanks formed at one end with jaws, a cross-bar loosely connecting the other ends of the shanks and formed with an opening intermediate the same, toggle-links connected to the jaws, a thrust rod operatively connected to the toggle-links and passing through the opening in the cross-bar, said thrust rod being threaded adjacent to said opening and having an abutment, a nut screwed on said threaded portion and engageable behind the cross-bar, and a spring engageable at its ends with the opposite side of the cross-bar and the abutment of the thrust rod, respectively.

In testimony that I claim the foregoing as my own, I have hereto affixed my signature in the presence of two witnesses.

JOHN G. SMITH.

Witnesses:
 ERNEST HANSON,
 OSCAR HANSON.